US011042259B2

(12) United States Patent
Scott, II et al.

(10) Patent No.: US 11,042,259 B2
(45) Date of Patent: Jun. 22, 2021

(54) VISUAL HIERARCHY DESIGN GOVERNED USER INTERFACE MODIFICATION VIA AUGMENTED REALITY

(71) Applicant: International Business Machines Corporation, Armonk, NY (US)

(72) Inventors: Willie L. Scott, II, Austin, TX (US); Charu Pandhi, Round Rock, TX (US); Mohit Jain, Bengaluru (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/543,584

(22) Filed: Aug. 18, 2019

(65) Prior Publication Data

US 2021/0048938 A1 Feb. 18, 2021

(51) Int. Cl.
*G06F 3/0481* (2013.01)
*G06F 3/01* (2006.01)
*G06T 7/73* (2017.01)
*G06K 9/00* (2006.01)
*G06T 19/00* (2011.01)
*G06F 16/58* (2019.01)

(52) U.S. Cl.
CPC ......... *G06F 3/04815* (2013.01); *G06F 3/013* (2013.01); *G06F 16/5866* (2019.01); *G06K 9/00671* (2013.01); *G06T 7/75* (2017.01); *G06T 19/006* (2013.01)

(58) Field of Classification Search
CPC .. G06F 3/04815; G06F 16/5866; G06F 3/013; G06T 7/75; G06T 19/006; G06K 9/00671
See application file for complete search history.

(56) References Cited

U.S. PATENT DOCUMENTS

| 9,448,962 | B2 | 9/2016 | Sharon et al. |
| 9,563,331 | B2 | 2/2017 | Poulos et al. |
| 9,928,654 | B2 | 3/2018 | Miller |
| 9,996,150 | B2 | 6/2018 | Swaminathan et al. |

(Continued)

FOREIGN PATENT DOCUMENTS

WO 9966394 W 2/2000

OTHER PUBLICATIONS

"Visual Hierarchy," The Interaction Design Foundation, accessed Jun. 2019, 8 pages.

(Continued)

*Primary Examiner* — Jennifer N To
*Assistant Examiner* — Amy P Hoang
(74) *Attorney, Agent, or Firm* — Vanleeuwen & Vanleeuwen; Alexander G. Jochym

(57) ABSTRACT

An approach is provided in which the approach the approach deconstructs a user interface into user interface elements that each are assigned an importance score. The approach compares a user eye gaze pattern of a user viewing the user interface against an expected eye gaze pattern corresponding to the user interface, and determines that the user requires assistance navigating the user interface. The approach selects one of the user interface elements based on its importance score, generates an augmented reality overlay of the selected user interface element, and displays the augmented reality overlay on the user interface using an augmented reality device.

17 Claims, 7 Drawing Sheets

(56) References Cited

U.S. PATENT DOCUMENTS

| | | |
|---|---|---|
| 10,019,962 B2 | 7/2018 | Liu et al. |
| 2012/0299961 A1* | 11/2012 | Ramkumar ........... G06T 19/006 |
| | | 345/632 |
| 2014/0361971 A1* | 12/2014 | Sala ....................... G06F 3/041 |
| | | 345/156 |
| 2016/0070344 A1* | 3/2016 | Gohl ....................... G06F 21/84 |
| | | 345/156 |
| 2017/0322679 A1 | 11/2017 | Gordon |
| 2019/0033965 A1* | 1/2019 | Raghunath .............. G06F 3/013 |
| 2019/0171283 A1* | 6/2019 | Dey ........................ G06N 20/00 |
| 2019/0362557 A1* | 11/2019 | Lacey ................... G06T 19/006 |

OTHER PUBLICATIONS

Bigman, "6 principles of visual hierarchy for designers," 99Designs Blog, Apr. 2019, 27 pages.

Wang et al., "Interactive eye tracking for gaze strategy modification," Proceedings of the 14th International Conference on Interaction Design and Children, ACM, Boston, MA, Jun. 2015, 5 pages.

"Canny edge detector," Wikipedia, Jun. 2019, 9 pages.

"Augmented Reality SDKs in 2018: Which are the best for Development," ARreverie Technology, Dec. 2017, 18 pages.

Redmon et al., "YOLOv3: An Incremental Improvement," University of Washington, 2018, 6 pages.

"Image Recognition based Augmented Reality," Wikitude, 2019, 6 pages.

Statt, "Vuzix starts selling its AR smart glasses for $1000," The Verge, Jan. 2019, 3 pages.

\* cited by examiner

VISUAL HIERARCHY DESIGN GOVERNED USER INTERFACE MODIFICATION VIA AUGMENTED REALITY

BACKGROUND

Visual hierarchy is an order in which a user's eye processes information on a page. Developers attempt to design a user interface such that the user interface allows users to easily understand information in an organized manner. By assigning different visual characteristics to various portions of the user interface, a designer influences what users perceive as being the next step in the visual hierarchy.

Anticipating user interaction is an important element in human-machine interface design. Guiding a user to perform a targeted action (e.g. make a purchase, download software, or follow a call-to-action) has long been an area of focus across industries. Several scientific experiments that involve eye gaze tracking have determined that individuals with cognitive disabilities, such as autism or people facing cognitive decline, tend to exhibit eye gazing behavior that is different from individuals that do not suffer from these challenges. Initial studies have also shown that it improving eye gaze behavior of users with cognitive disabilities is possible by blurring out parts of a screen on which they mistakenly gaze and only maintain in focus a desired next step.

BRIEF SUMMARY

According to one embodiment of the present disclosure, an approach is provided in which the approach deconstructs a user interface into user interface elements that each are assigned an importance score. The approach compares a user eye gaze pattern of a user viewing the user interface against an expected eye gaze pattern corresponding to the user interface, and determines that the user requires assistance navigating the user interface. The approach selects one of the user interface elements based on its importance score, generates an augmented reality overlay of the selected user interface element, and displays the augmented reality overlay on the user interface using an augmented reality device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
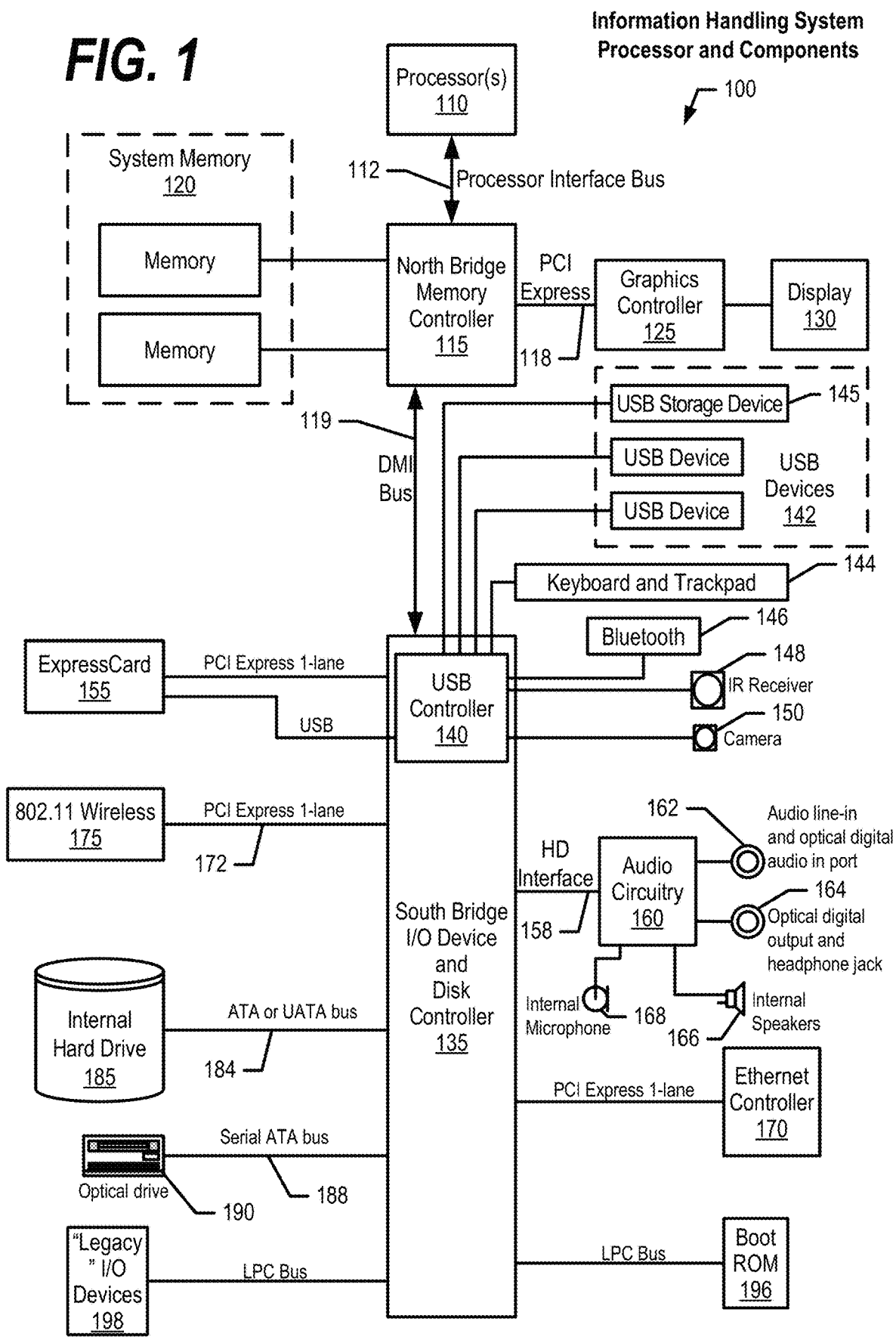
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119.

In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
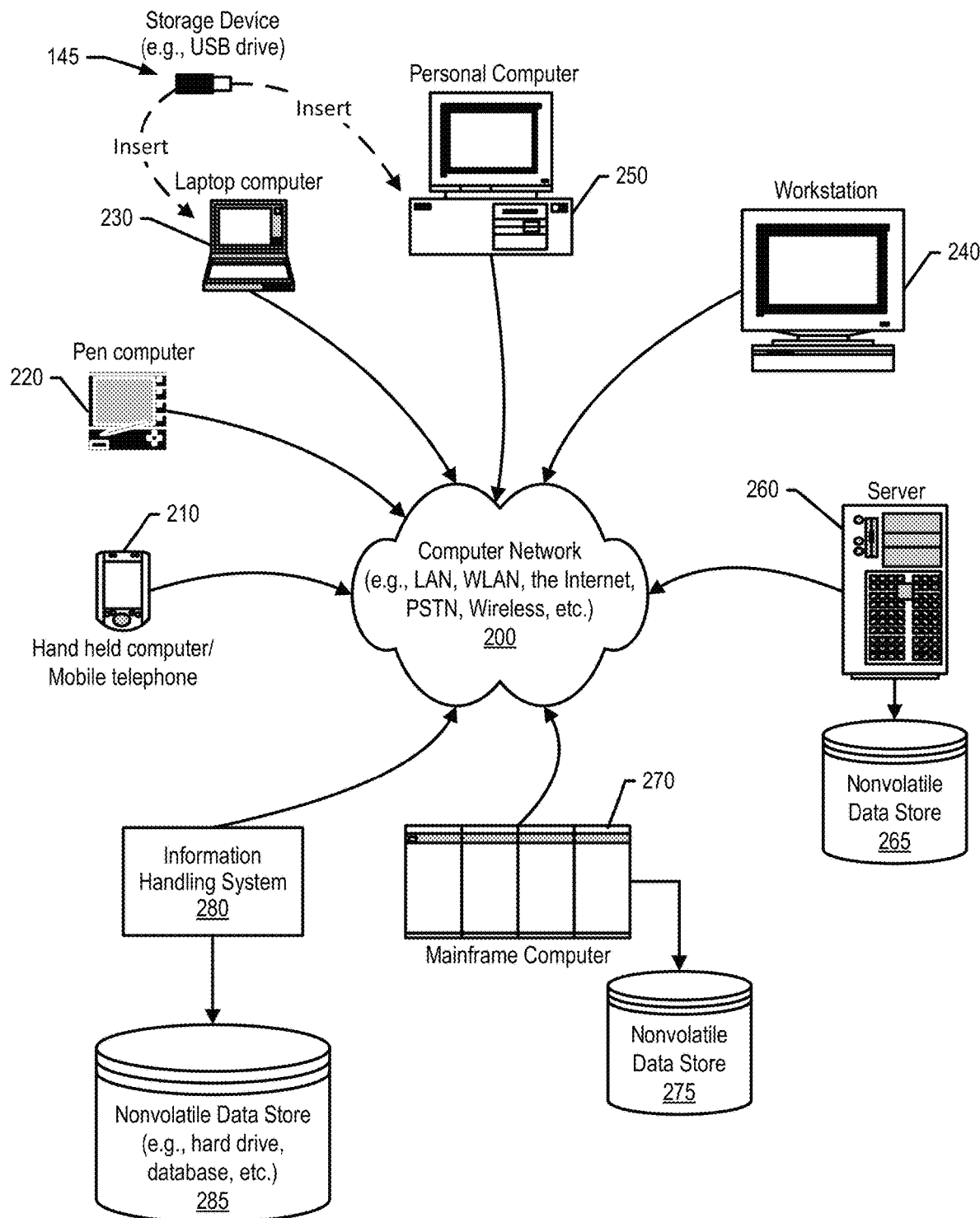
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, prior approaches to influence certain users to a desired next step on a user interface is to blur out parts of the user interface on which the user mistakenly gazes and retain proper focus on a desired next step. However, such an approach has a significant drawback because, in most instances, user interface pages are provided to a user's device in their entirety and are not provided as individual elements (e.g., OK button, BACK button, etc.). As such, a user's device is not able to single out a particular component for which to highlight.

FIGS. 3 through 7 depict an approach that can be executed on an information handling system that guides a user to a desired next step using augmented reality (AR). Augmented reality is an interactive experience of a real-world environment where objects that reside in the real-world are enhanced by computer-generated perceptual information. In contrast to virtual reality that completely replaces the user's real-world environment with a simulated environment, augmented reality seamlessly interweaves with the physical world such that a user perceives the augmented reality as an immersive aspect of the real environment.

The approach performs a training phase and learns baseline behavior for "expected" and "outlier" eye gaze patterns from users interacting with a user interface. Expected eye gaze patterns are those patterns that typical users exhibit and follow an expected visual hierarchy pattern. Outlier eye gaze patterns are atypical patters that do not align with the designer's anticipated audience behavior given the principles of visual hierarchy, such as repeated circular patterns when viewing the user interface without taking action.

Following the training phase, a user equipped with an augmented reality device (e.g., goggles, glasses, etc.) interacts with the user interface. The approach evaluates the user's eye gaze patterns and classifies the patterns as "expected" or "outlier". When the user's eye gaze patterns suggest "outlier" behavior (to exceed some threshold time duration), the approach identifies an element in the user interface corresponding to a desired next step (e.g., an OK button), generates an AR element that corresponds to the identified element, and overlays the AR element on the user interface using the AR device to guide the user's focus to the desired next step (e.g., change the user's viewing behavior).

In one embodiment, an object detection artificial intelligence (AI) module, trained to detect UI (user interface) elements, detects the location of the elements (from screenshots) and extracts a 2D images of the UI element that require interaction (in order for the user to follow the desired path of visual hierarchy, e.g., a "buy" button in an digital marketplace UI). The approach then coverts the extracted 2D images to 3D models suitable for AR rendering.

Figure 3:
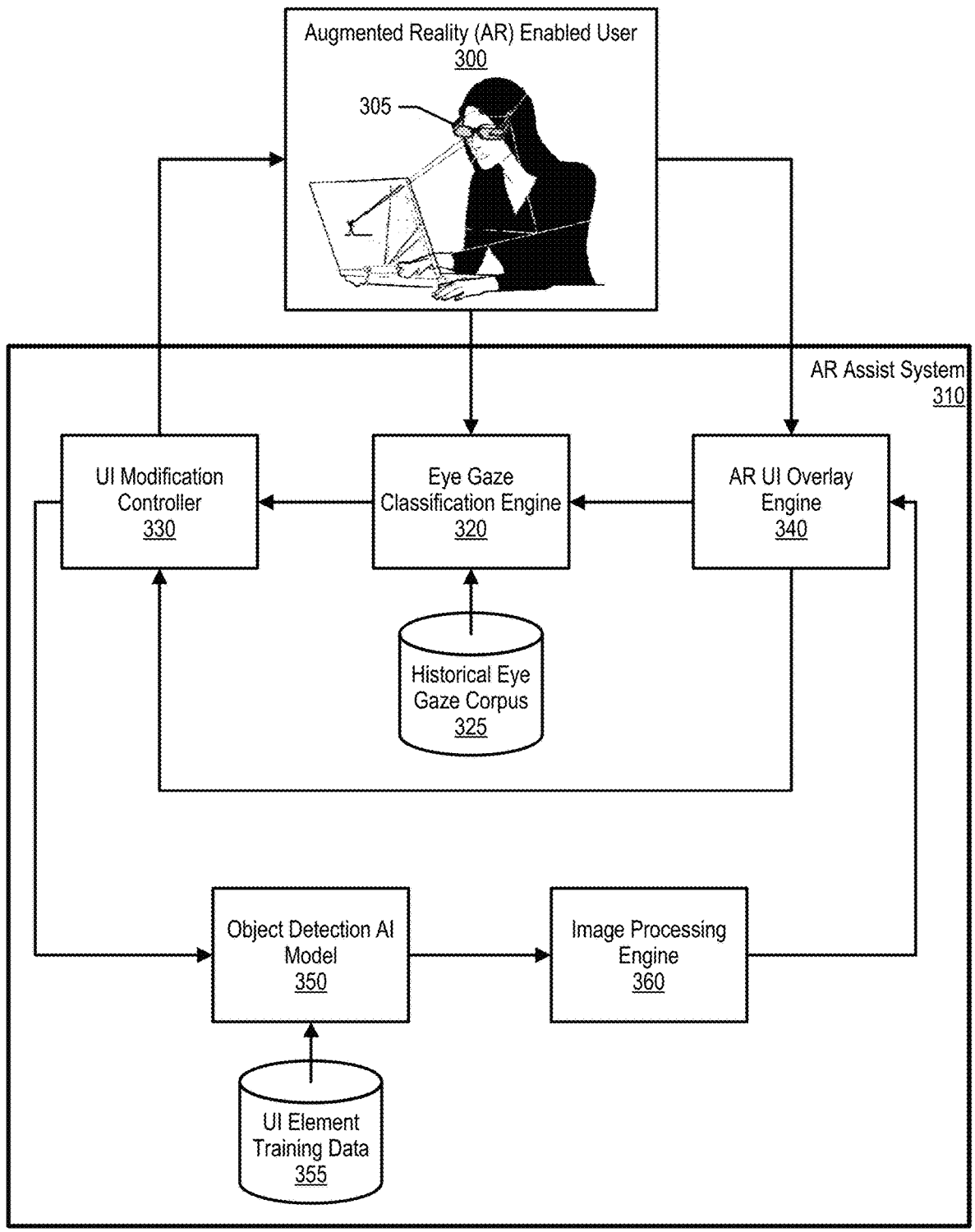
FIG. 3 is an exemplary diagram depicting a user using an augmented reality (AR) device to aid the user through a user interface visual hierarchy.

FIG. 3 is an exemplary diagram depicting a user using an augmented reality (AR) device 305 to aid the user through a user interface visual hierarchy. AR assist system 310 works in conjunction with AR device (glasses) 305 to monitor AR enabled user 300's eye gaze patterns on a user interface and augment the user interface when outlier eye gaze patterns are detected. AR assist system 310 interfaces with AR enabled user 300 through eye gaze classification engine 320, user interface (UI) modification controller 330, and AR UI overlay engine 340.

As discussed above, AR assist system 310 performs a training stage and stores expected eye gaze patterns in historical eye gaze corpus 325. At runtime, eye gaze classification engine 320 monitors and classifies eye gaze patterns of AR enabled user 300 by comparing AR enabled user 300's eye gaze pattern against an expected eye gaze pattern of the corresponding user interface (see FIG. 4 and corresponding text for further details). In one embodiment, eye gaze classification engine 320 maps the eye gaze to feature vectors and then uses the feature vectors to classify the eye gaze. Eye gaze classification engine 320 sends the classification to UI modification controller 330.

When UI modification controller 330 receives an "outlier" classification, UI modification controller 330 captures a screen shot of the user interface being viewed by AR enabled user 300 and sends the screenshot to object detection AI model 350. Object detection AI model 350 decomposes the screenshot into elements/regions based on UI element training data 355. In one embodiment, object detection AI model 350 performs this step manually. In another embodiment, object detection AI model 350 uses a visual recognition AI to perform object detection within the UI window. In this embodiment, UI modification controller 330 captures a screenshot of the UI window and object detection AI model 350 uses a custom trained You-Only-Look-Once (YOLO) convolutional neural network model to perform object detection of the UI objects (also referred to herein as elements) within the screenshot. Object detection AI model 350 then captures the bounding box coordinates of the detected elements/regions.

Image processing engine 360 receives the information from object detection AI model 350 and determines bounding box coordinates of the elements/regions. Then, image processing engine 360 assigns an importance level to the captured elements, such as based on a visual hierarchy of the user interface. In one embodiment, within each user interface, elements are labeled as elements of interests with a tuple denoting a sequencing of anticipated user interactions given the design visual hierarchy, along with a weighting factor corresponding to the importance of the user completing a specific interaction given the context. In another embodiment, the labeling is performed automatically based on predictions made by historical user interactions in a similar context.

For each important element, image processing engine 360 uses the bounding box coordinates of the captured elements to extract the bounding box (and thus a cropped image of the UI element itself) from the original screenshot image. Within each bounding box for the extracted elements of interest, image processing engine 360 uses an edge detection approach to identify the edges of the object. Image processing engine 360 extracts the objects from the bounding boxes and eliminates the background image.

At this point, image processing engine 360 provides the extracted 2D images of the elements to AR UI overlay engine 340. AR UI overlay engine 340 performs 2D image matching and tracking via an AR translation module, in one embodiment, to map the 2D object model to a 3D object model that is suitable for rendering via an AR framework. Based on the object's importance as previously identified, AR UI overlay engine 340 applies individual (or a combination) of visual effects to the AR rendering of the UI element to increase user focus via visual hierarchy.

AR UI overlay engine 340 sends the rendered 3D model (AR element) to UI modification controller 330, which sends the AR element to AR device 305. AR device 305 overlays the AR element onto the user interface such that AR enabled user 300 notices (see FIG. 5 and corresponding text for further details). In one embodiment, visual effects are applied to the AR element based on a desired interaction sequence and importance score. Thus, the higher the importance score, the more important the element is "highlighted" within the frame, such as enlarging the element, applying color highlights to the element, applying vibration movements to the element, etc. In one embodiment, when AR enabled user 300 notices the augmented reality element, UI modification controller 330 removes the AR element so that AR enabled user 300 can select the actual user interface element on the user interface.

Figure 4:
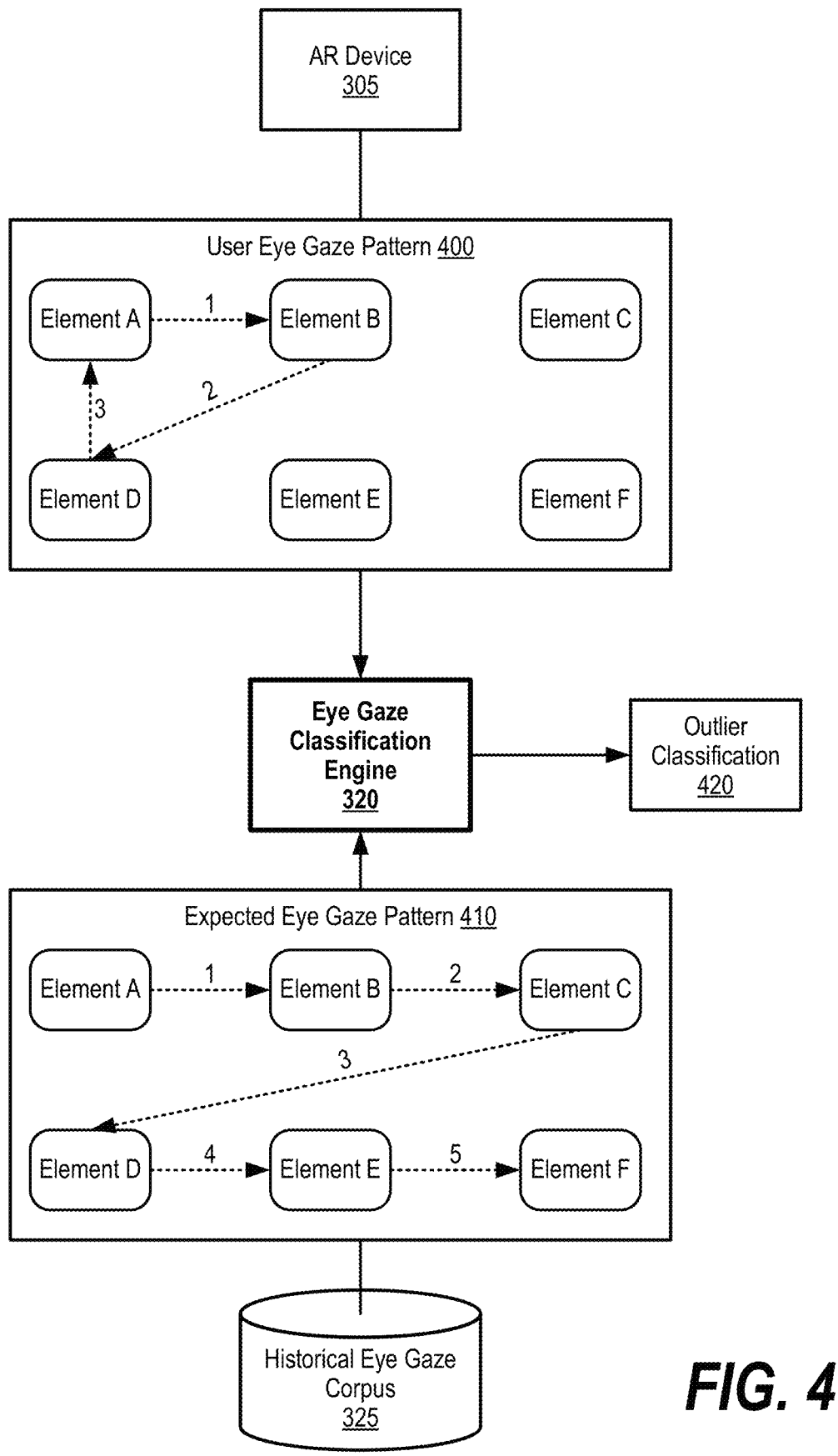
FIG. 4 is an exemplary diagram depicting an eye gaze classification engine evaluating a user's eye gaze pattern against an expected eye gaze pattern.

FIG. 4 is an exemplary diagram depicting an eye gaze classification engine evaluating a user's eye gaze pattern against an expected eye gaze pattern. AR device 305 captures user eye gaze pattern 400 and sends user eye gaze pattern 400 to eye gaze classification engine 320. In one embodiment, user eye gaze pattern 400 include data points mapped to feature vectors.

Eye gaze classification engine 320 retrieves expected eye gaze pattern 410 from historical eye gaze corpus 325 that matches the user interface being viewed by the user. Eye gaze classification engine 320 compares the two patterns and determines whether user eye gaze pattern 400 is an outlier pattern based on various classification approaches. The example in FIG. 4 shows that eye gaze classification engine 320 classifies user eye gaze pattern 400 as outlier classification 420, which in turn feeds to UI modification controller 330 for further processing.

Figure 5:
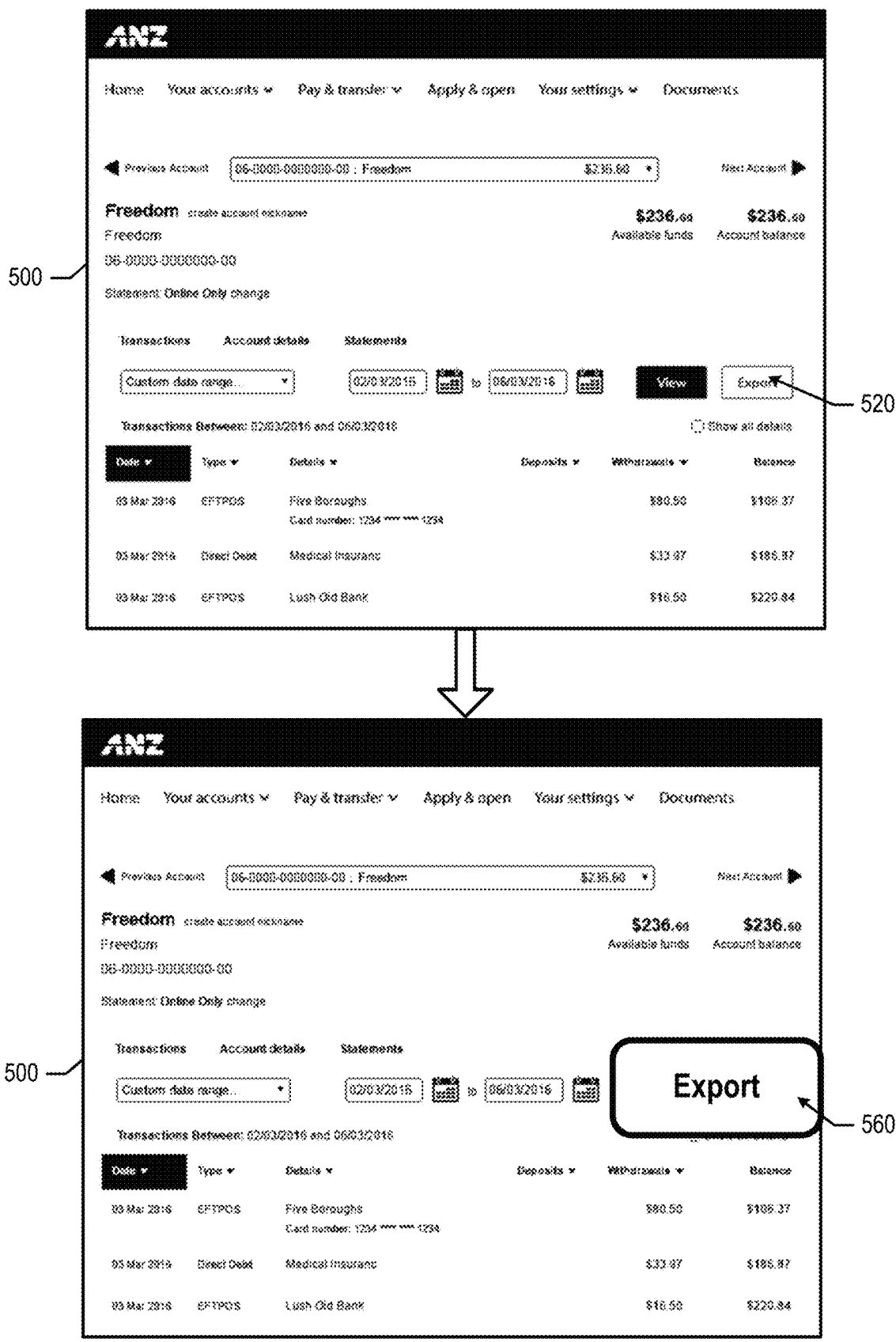
FIG. 5 is an exemplary diagram depicting an AR assist system overlaying an augmented reality element onto a user interface when a user exhibits an outlier eye gaze pattern.

FIG. 5 is an exemplary diagram depicting an AR assist system overlaying an augmented reality element onto a user interface when a user exhibits an outlier eye gaze pattern.

A user views user interface 500 and begins to exhibit outlier eye gaze patterns as discussed herein. For example, the user may be a user that suffers from progressive cognitive decline. As the user is traversing user interface 500, the user's eye gaze patterns are observed by AR assist system 310 and, as the user's eye gaze repeatedly scans user interface 500, AR assist system 310 marks the user's eye gaze pattern as an "outlier" compared to an expected gaze behavior of user interface 500.

Next, AR assist system 310 decompose user interface 500 and evaluates elements of user interface 500. AR assist system 310 determines that the user's next step is to select export button 520. As such, AR assist system 310 overlays "EXPORT" overlay 560 onto user interface 500 to assist the user in moving along the visual hierarchy of user interface 500. In one embodiment, AR assist system 310 removes AR overlay 560 when the user gazes at export overlay 560 or moves a mouse icon over export overlay 560. This allows the user to click the actual export button (Export button 520) on user interface 500 to complete the user's transaction.

Figure 6:
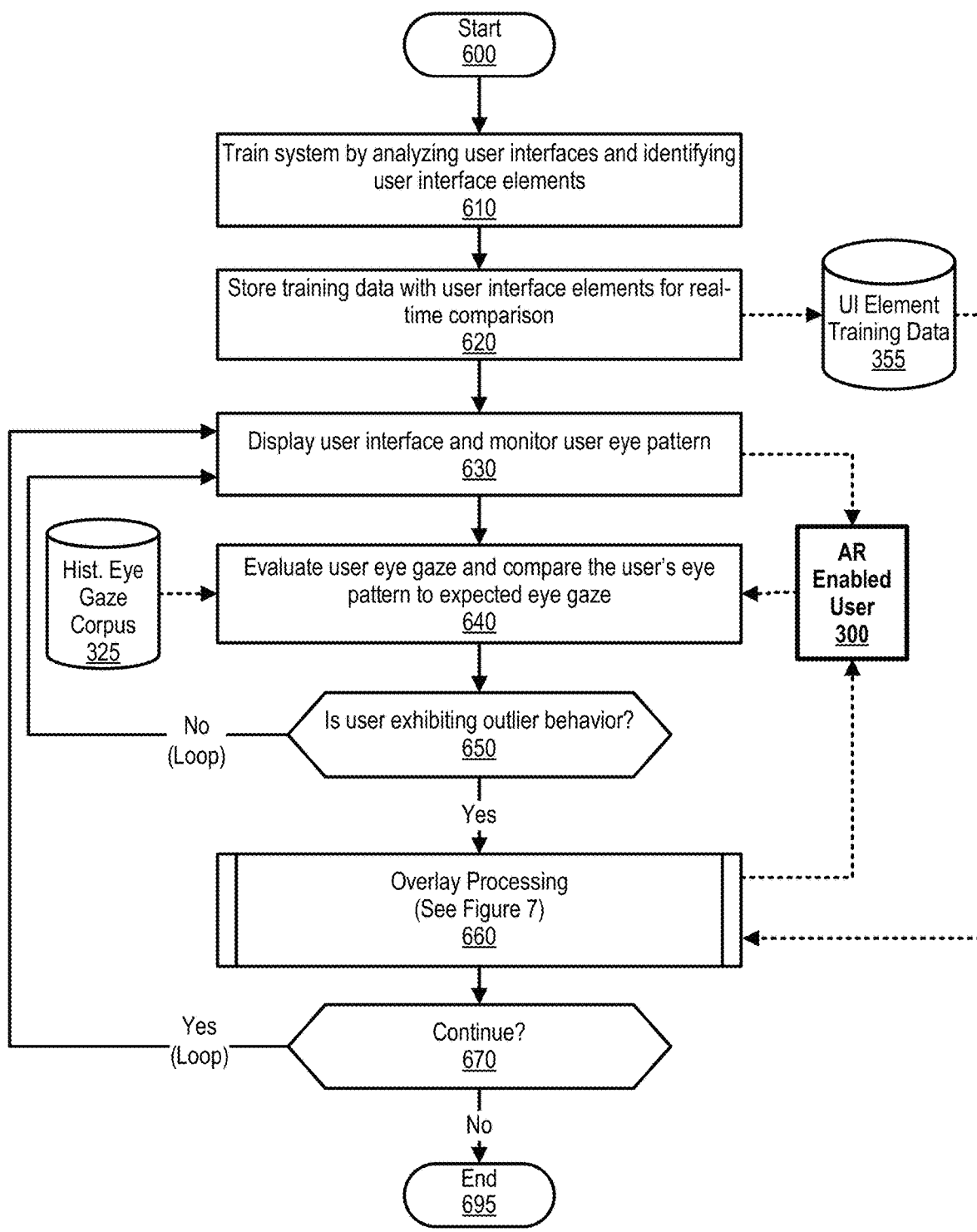
FIG. 6 is an exemplary flowchart showing steps taken to detect an outlier eye gaze pattern and apply an AR overlay onto a user interface.

FIG. 6 is an exemplary flowchart showing steps taken to detect an outlier eye gaze pattern and apply an AR overlay onto a user interface. FIG. 6 processing commences at 600 whereupon, at step 610, the process trains the system by analyzing user interfaces and identifying user interface elements, such as "BUY," "SUBMIT," etc. At step 620, the process stores the training data in UI element training data 355 for subsequent real-time use. In one embodiment, the process performs steps 610 and 620 prior to displaying user interfaces to AR enabled user 300 (as shown). In another embodiment, the process performs steps 610 and 620 in real-time when AR enabled user 300 selects a page of data (e.g., webpage) to display.

At step 630, the process displays the user interface to AR enabled user 300 and begins to monitor the user's eye pattern. At step 640, the process evaluates the user's eye gaze and compares the user's eye gaze pattern to an expected eye gaze stored in historical eye gaze corpus 325 (see FIG. 4 and corresponding text for further details). The process determines as to whether the user is exhibiting outlier behavior, such as by moving the user's eyes in a circular pattern without performing an action (decision 650).

If the user is not exhibiting outlier behavior, then decision 650 branches to the 'no' branch which loops back to continue to monitor the user's eye pattern. This looping continues until the user's eye pattern exhibits outlier behavior, at which point decision 650 branches to the 'yes' branch exiting the loop. At predefined process 660, the process performs steps to add an AR overlay to the user interface to assist the user in performing a next action, such as emphasizing an element on the user interface (see FIG. 7 and corresponding text for processing details).

The process determines as to whether to continue (decision 670). If the process should continue, then decision 670 branches to the 'yes' branch which loops back to continue to monitor the user's eye pattern. This looping continues until the process should terminate, at which point decision 670 branches to the 'no' branch exiting the loop. FIG. 6 processing thereafter ends at 695.

Figure 7:
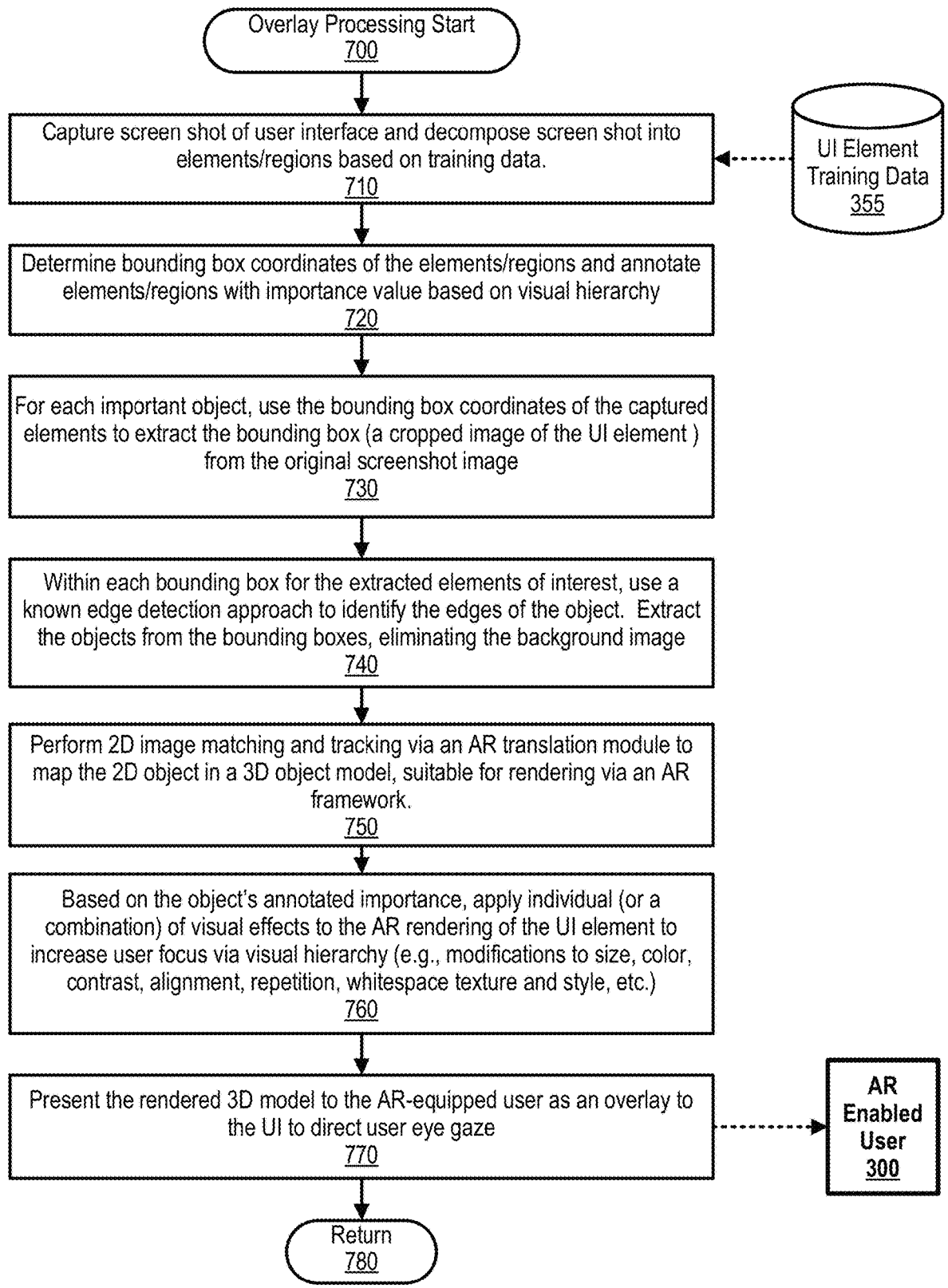
FIG. 7 is an exemplary flowchart showing steps taken to identify and add an overlay to a user interface to assist the user in performing a desired next step.

FIG. 7 is an exemplary flowchart showing steps taken to identify and add an overlay to a user interface to assist the user in performing a desired next step. FIG. 7 processing commences at 700 whereupon at step 710, the process captures a screen shot of the user interface and decomposes the user interface into elements/regions based on training data stored in UI element training data 355.

At step 720, the process determines bounding box coordinates of the various elements/regions and annotates the elements/regions with importance values. In one embodiment, the process uses tuples for the annotations and the importance values are based on a visual hierarchy of the user interface.

At step 730, the process identifies the important elements, which are those elements having an importance score higher than a predefined threshold. In one embodiment, the important elements are the next elements the user interface's visual hierarchy based on the user's eye gaze pattern. For each important element, the process uses its bounding box coordinates of the captured elements to extract the bounding box (e.g., a cropped image of the UI element) from the original screenshot image.

At step 740, within each bounding box for the extracted elements of interest, the process uses an edge detection approach to identify the edges of the element. The process extracts the elements from the bounding boxes and eliminates the background image. At step 750, the process performs 2D image matching and tracking via, in one embodiment, an AR translation module to map the 2D element to a 3D object model (element) that is suitable for rendering via an AR framework.

At step 760, based on the element's annotated importance, the process applies individual (or a combination) of visual effects to the AR rendering of the AR element to increase a user focus via visual hierarchy (e.g., modifications to size, color, contrast, alignment, repetition, whitespace texture and style, etc.). For example, if the element is of high importance, the process adds a highlighting layer as well as increasing the size of the element. At step 770, the process presents the rendered AR element (3D model) to AR enabled user 300 via AR device 305 as an overlay to the UI to direct user eye gaze. FIG. 7 processing thereafter returns to the calling routine (see FIG. 6) at 780.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
comparing a user eye gaze pattern of a user viewing a user interface against an expected eye gaze pattern corresponding to the user interface; and
in response to determining, based on the comparing, that the user requires assistance navigating the user interface:
capturing a screenshot of the user interface;
identifying a plurality of bounding box coordinates of a plurality of elements located in the captured screenshot;
annotating the plurality of elements with a plurality of importance scores based on a sequencing of anticipated user interactions according to a visual hierarchy design of the user interface;
identifying one of the plurality of user interface elements based on the sequencing of anticipated user interactions, wherein the identified user interface element corresponds to one of the plurality of bounding box coordinates;
extracting a two dimensional image of the identified user interface element from the captured screenshot based on the corresponding bounding box coordinates, wherein the two dimensional image comprises a first set of content;
mapping the two dimensional image to a three dimensional object model, wherein the three dimensional object model comprises only a second set of content that matches the first set of content; and
displaying the three dimensional object model as an augmented reality overlay on the user interface using an augmented reality device, wherein the augmented reality overlay is positioned over the identified user interface element.

2. The method of claim 1 wherein the expected eye gaze pattern is based on the visual hierarchy design of the user interface.

3. The method of claim 1 further comprising:
positioning the augmented reality overlay over the identified user interface element such that the identified user interface element is hidden from the user;
detecting that the user is viewing the augmented reality overlay; and
removing the augmented reality overlay in response to detecting that the user is viewing the augmented reality overlay.

4. The method of claim 1 further comprising:
creating the plurality of importance scores based on evaluating a set of historical eye gaze patterns from a set of prior users.

5. The method of claim 1 further comprising:
adding one or more visual effects to the augmented reality overlay based on the importance score of the identified user interface element.

6. The method of claim 5 wherein at least one of the one or more visual effects is selected from the group consisting of an enlargement effect, a color highlighting effect, a contrast effect, an alignment effect, a repetition effect, a whitespace texture effect, a flashing effect, and a vibration movement effect.

7. An information handling system comprising:
one or more processors;
a memory coupled to at least one of the processors;
a set of computer program instructions stored in the memory and executed by at least one of the processors in order to perform actions of:
comparing a user eye gaze pattern of a user viewing a user interface against an expected eye gaze pattern corresponding to the user interface; and
in response to determining, based on the comparing, that the user requires assistance navigating the user interface:
capturing a screenshot of the user interface;
identifying a plurality of bounding box coordinates of a plurality of elements located in the captured screenshot;
annotating the plurality of elements with a plurality of importance scores based on a sequencing of anticipated user interactions according to a visual hierarchy design of the user interface;
identifying one of the plurality of user interface elements based on the sequencing of anticipated user interactions, wherein the identified user interface element corresponds to one of the plurality of bounding box coordinates;
extracting a two dimensional image of the identified user interface element from the captured screenshot based on the corresponding bounding box coordinates, wherein the two dimensional image comprises a first set of content;
mapping the two dimensional image to a three dimensional object model, wherein the three dimensional object model comprises only a second set of content that matches the first set of content; and
displaying the three dimensional object model as an augmented reality overlay on the user interface using an augmented reality device, wherein the augmented reality overlay is positioned over the identified user interface element.

8. The information handling system of claim 7 wherein the expected eye gaze pattern is based on the visual hierarchy design of the user interface.

9. The information handling system of claim 7 wherein the processors perform additional actions comprising:
positioning the augmented reality overlay over the identified user interface element such that the identified user interface element is hidden from the user;
detecting that the user is viewing the augmented reality overlay; and
removing the augmented reality overlay in response to detecting that the user is viewing the augmented reality overlay.

10. The information handling system of claim 7 wherein the processors perform additional actions comprising:
creating the plurality of importance scores based on evaluating a set of historical eye gaze patterns from a set of prior users.

11. The information handling system of claim 7 wherein the processors perform additional actions comprising:
adding one or more visual effects to the augmented reality overlay based on the importance score of the identified user interface element.

12. The information handling system of claim 11 wherein at least one of the one or more visual effects is selected from the group consisting of an enlargement effect, a color highlighting effect, a contrast effect, an alignment effect, a repetition effect, a whitespace texture effect, a flashing effect, and a vibration movement effect.

13. A computer program product stored in a computer readable storage medium, comprising computer program code that, when executed by an information handling system, causes the information handling system to perform actions comprising:

comparing a user eye gaze pattern of a user viewing a user interface against an expected eye gaze pattern corresponding to the user interface; and in response to determining, based on the comparing, that the user requires assistance navigating the user interface:

capturing a screenshot of the user interface;

identifying a plurality of bounding box coordinates of a plurality of elements located in the captured screenshot;

annotating the plurality of elements with a plurality of importance scores based on a sequencing of anticipated user interactions according to a visual hierarchy design of the user interface;

identifying one of the plurality of user interface elements based on the sequencing of anticipated user interactions, wherein the identified user interface element corresponds to one of the plurality of bounding box coordinates;

extracting a two dimensional image of the identified user interface element from the captured screenshot based on the corresponding bounding box coordinates, wherein the two dimensional image comprises a first set of content;

mapping the two dimensional image to a three dimensional object model, wherein the three dimensional object model comprises only a second set of content that matches the first set of content; and displaying the three dimensional object model as an augmented reality overlay on the user interface using an augmented reality device, wherein the augmented reality overlay is positioned over the identified user interface element.

14. The computer program product of claim 13 wherein the expected eye gaze pattern is based on the visual hierarchy design of the user interface.

15. The computer program product of claim 13 wherein the information handling system performs further actions comprising:

positioning the augmented reality overlay over the identified user interface element such that the identified user interface element is hidden from the user;

detecting that the user is viewing the augmented reality overlay; and removing the augmented reality overlay in response to detecting that the user is viewing the augmented reality overlay.

16. The computer program product of claim 13 wherein the information handling system performs further actions comprising:

creating the plurality of importance scores based on evaluating a set of historical eye gaze patterns from a set of prior users.

17. The computer program product of claim 13 wherein the information handling system performs further actions comprising:

adding one or more visual effects to the augmented reality overlay based on the importance score of the identified user interface element, wherein at least one of the one or more visual effects is selected from the group consisting of an enlargement effect, a color highlighting effect, a contrast effect, an alignment effect, a repetition effect, a whitespace texture effect, a flashing effect, and a vibration movement effect.

* * * * *